April 1, 1947.   R. N. LESNICK ET AL   2,418,306
DIFFERENTIAL SERVO SYSTEM
Filed May 26, 1945    2 Sheets-Sheet 1
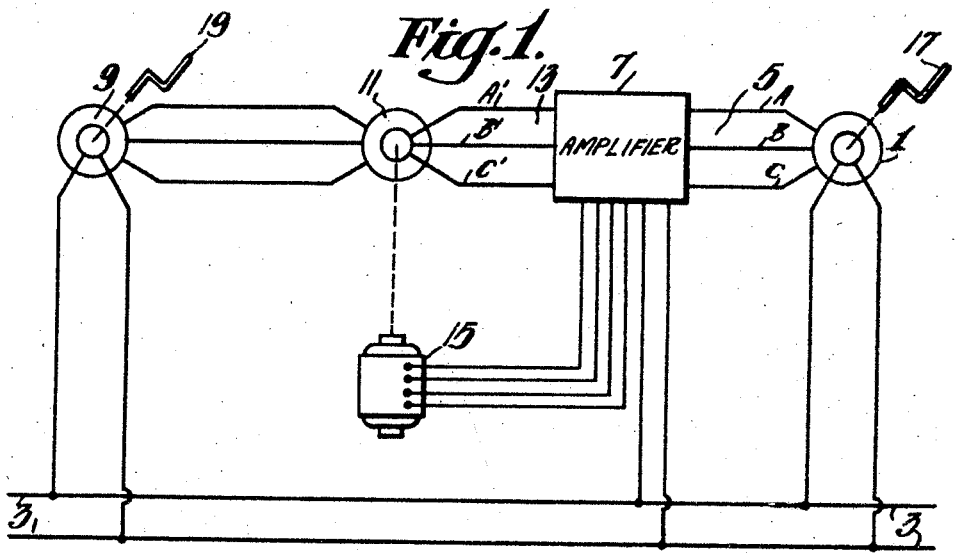
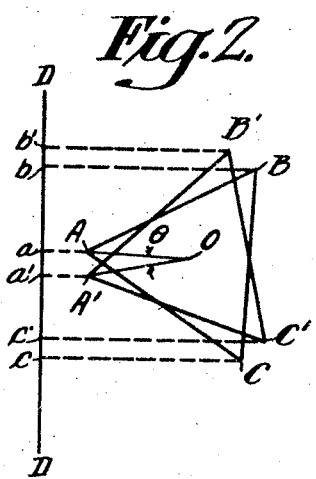
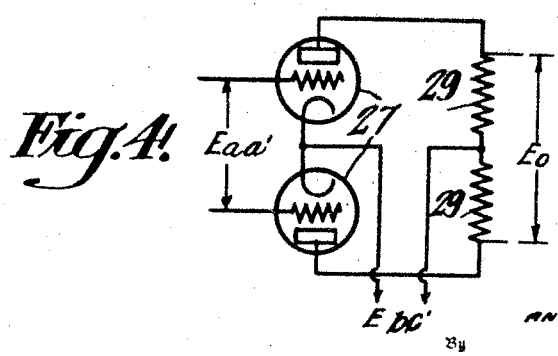
Inventors
ROBERT N. LESNICK
AND LESLIE E. MATSON, JR.
Attorney

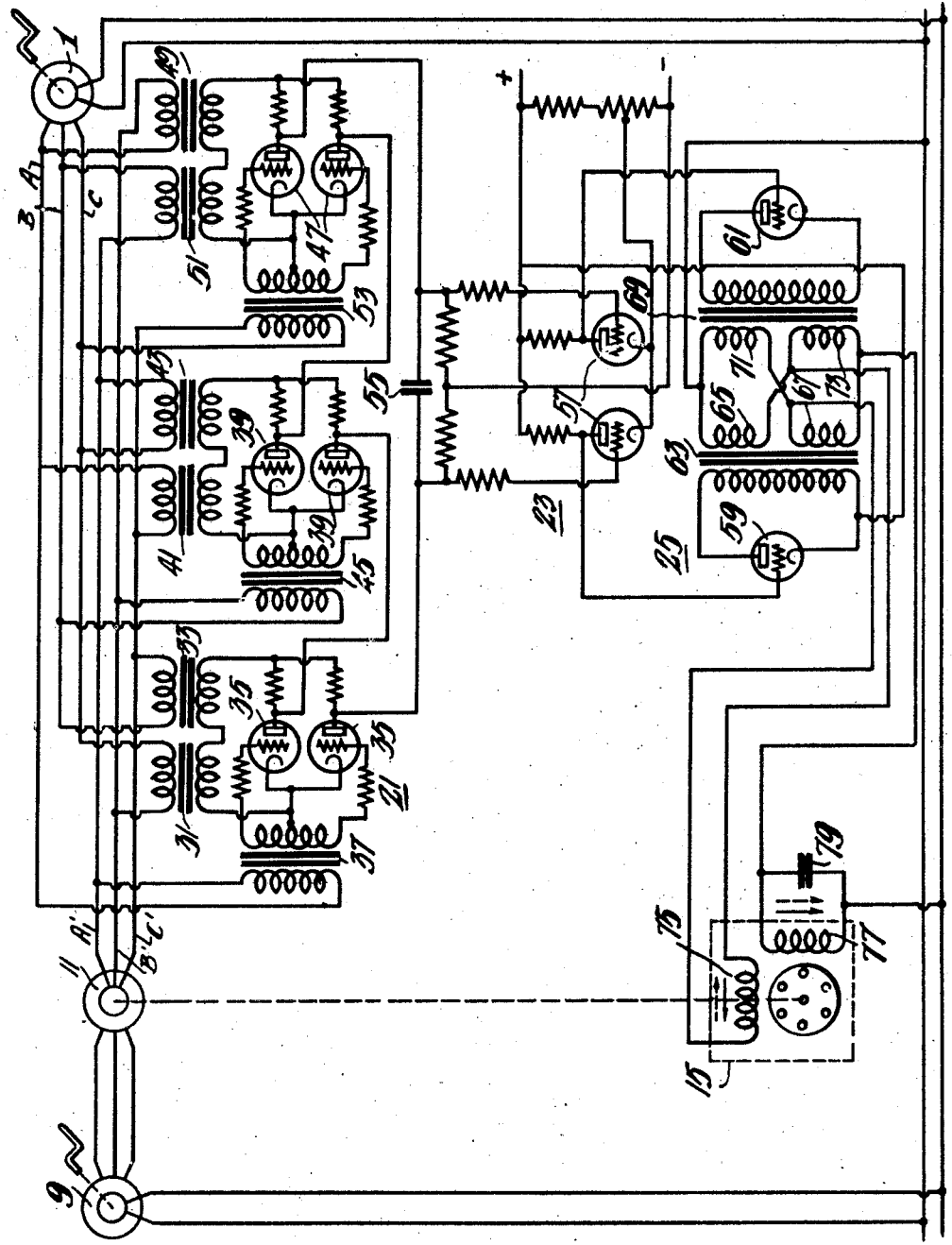

Patented Apr. 1, 1947

2,418,306

UNITED STATES PATENT OFFICE 2,418,306

DIFFERENTIAL SERVO SYSTEM

Robert N. Lesnick, Camden, and Leslie E. Matson, Jr., Collingswood, N. J., assignors to Radio Corporation of America, a corporation of Delaware Application May 26, 1945, Serial No. 595,916

6 Claims. (Cl. 172—239)

This invention relates to differential servo systems and more particularly to the control of the position of a shaft by two independent control means.

The usual electrical servo system comprises a control or input shaft and a load or output shaft, a motor connected to the output shaft, and means responsive to the difference in the angular positions of the input and output shafts to control the motor so as to drive the output shaft into positional agreement with the control or input shaft. Machines commonly denoted as "Selsyn" or synchro transformers may be employed to derive an A.-C. control signal related in magnitude and polarity to the difference in angular position between the input and output shafts. This signal may be amplified or otherwise utilized to control the application of power to the driving motor.

Servo systems of this type are employed for a great many purposes, including the control of guns, searchlights and rotatable directive radio antennas. In certain applications, particularly on shipboard or the like, it is desirable to control the output shaft as a function of two variables, for example, the azimuth with respect to the axis of the ship, and the ship's course with respect to the local meridian. Two or more control signals may be superimposed upon each other by means of cascade connected Selsyn transformers, to provide a resultant signal corresponding to the sum of the angular rotations of the several control shafts. In some applications, however, arrangements of this type may not prove feasible; for example, previously installed equipment may impose limitations upon the type of control signal with which the servo system must operate. In the case of shipboard installation it may be necessary to produce separate signals corresponding to the azimuth of an object relative to the ship and the ship's course relative to the local meridian in addition to a combined signal corresponding to their sum.

Accordingly it is the principal object of the present invention to provide an improved method of and means for positioning a shaft in response to two independent electrical signals of the type produced by Selsyn transformers or the like.

Another object is to provide an improved method of and means for controlling an electric motor in response to two A.-C. signals to drive an output shaft to an angular position corresponding to the algebraic sum of said signals.

These and other objects will become apparent to those skilled in the art upon consideration of the following description with reference to the accompanying drawing, of which:

Figure 1 is a schematic diagram of a servo system arranged in accordance with the instant invention, Figure 2 is a graphical representation of the control signal voltages produced in the operation of the system of Figure 1, Figure 3 is a schematic circuit diagram of the system illustrated in Figure 1, and Figure 4 is a schematic diagram of a rectifier circuit, explanatory of the operation of the circuit of Figure 3.

Referring to Figure 1, a Selsyn generator 1 is connected between an A.-C. supply 3 and an input circuit 5 of an amplifier 7. A second Selsyn generator 9 is connected between the supply 3 and a third Selsyn generator 11. The secondary circuit of the generator 11 is connected to a second input circuit 13 of the amplifier 7. The amplifier 7 is connected to the A.-C. supply 3 and to a motor 15. The shaft of the motor 15 is connected to the mechanical load, not shown, and to the rotor shaft of the Selsyn generator 11. The shafts of the Selsyn generators 1 and 9 are mechanically connected to control input members such as cranks 17 and 19 respectively.

In operation, the generators 1 and 9 provide A.-C. signals corresponding to the angular positions of the cranks 17 and 19 respectively. The output of the generator 1 is applied directly to the input circuit 5 and the output of the generator 9 is applied through the differential generator 11 to the input circuit 13. The amplifier 7 controls the application of energy from the A.-C. supply 3 to the motor 15, causing the motor to run in one direction or the other depending upon the relative positions of the cranks 17 and 19. The rotor of the differential generator 11 is driven by the motor 15, superimposing upon the signal from the generator 9, a signal corresponding to the position of the motor. The motor continues to rotate until the signals applied to the input circuits 5 and 13 are the same, whereupon the amplifier 7 deenergizes the motor. At this time the angular position of the motor shaft is the sum of the angular positions of the cranks 17 and 19.

Referring to Figure 2, the input voltages to the amplifier 7 from the Selsyn transformers 1 and 11 respectively are represented by the projections of the equilateral triangles A, B, C and A', B', C' upon the reference line D—D. These voltages appear on the correspondingly designated lines from the Selsyn transformers. Thus, the voltage between the lines A and B from the transformer 1 is proportional to the length of the segment ab on the line D—D. The voltage between the lines B and C is similarly proportional to the length of the segment bc. All of these voltages are in time phase but may reverse in polarity. Thus, in Figure 2 the voltage bc is of the opposite polarity from the voltage ab. The triangle ABC may be considered to rotate about its center point 0 when the shaft of the transformer 1 is rotated. The maximum voltage obtained is represented by the length of one of the sides of the triangle. The voltages from the transformer 11 are determined similarly by the position of the shaft of said transformer.

For the condition of balance as described above, the point A must coincide with the point A', the point B with point B', etc. To obtain this condition one of the triangles must be rotated through the angle θ. This can be accomplished by turning the rotor of the differential Selsyn transformer 11.

Referring to Figure 3, the amplifier 7 comprises three parts: a directional rectifier 21, a voltage amplifier 23, and a power control circuit 25. It is the purpose of the directional rectifier to convert the A.-C. input signals into a D.-C. voltage of which the magnitude and polarity are functions of the A.-C. voltages abc and a'b'c'. The voltage amplifier 23 amplifies this D.-C. voltage to operate the motor control circuit 25, which controls the energization of the motor 15.

The direction rectifier circuit must give a D.-C. output which is proportional in magnitude to the angle θ and has a polarity depending on whether the triangle ABC leads or lags the triangle A'B'C'. It should be noted that these voltages are in time phase but have magnitudes related to each other so as to define angular positions. The voltage aa' is directly proportional to the angle θ for small angles. This voltage may be applied to the grids of a pair of electron discharge tubes 27, as illustrated in Figure 4, and the voltage b'c, which is also proportional to the angle θ for small angles, may be applied to the anodes through load resistors 29. This will provide a differential D.-C. voltage between the anodes of the tubes 27 of a magnitude and polarity depending upon the input signals. The circuit of Figure 4 will operate satisfactorily for small angles, but when θ becomes large, the polarity of the voltage bc' will reverse with respect to that of the voltage aa'. The voltage bc' may be applied to the anode circuit of the tubes 27 but when θ is more than 120° this voltage will reverse with respect to the voltage aa' and the system will cease to operate.

Referring to Figure 3, the sum of the voltages b'c and bc' is applied through transformers 31 and 33 to the anode circuit of the triode tubes 35. The voltage aa' is applied to the control grids through a transformer 37. A second pair of triodes 39 is similarly connected through transformers 41, 43 and 45 to apply the voltages ac' and a'c for anode potential, and the voltage bb' for control grid potential. A third pair of triodes 47 is coupled through transformers 49, 51 and 53 to employ the sum of the voltages ab' and a'b for anode potential, and the voltage cc' as control grid signal.

The operation of the direction rectifier circuit is as follows:

When the voltage aa' applied to the control grids of the tubes 35 is zero, the plate currents are equal, providing equal drops in the load resistors and zero difference in potential between the two plates. When the voltage aa' has some finite value, one or the other of the tubes 35 will conduct more than the other, depending upon the polarity of the voltage aa' with respect to the anode voltage b'c plus bc'. Thus the output of the tubes 35 will be pulsating direct current, of variable magnitude and reversible polarity in response to the relative positions of the voltage triangles ABC and A'B'C'. The sum of the voltages bc' and b'c is relatively constant over a wide range of variation of the angles θ.

Referring to Figure 2 the signal voltage input aa' and the plate voltage b'c vary simultaneously when the two triangles ABC and A'B'C' rotate together. At some point the projection of the line aa' of the line AA' is zero even though the points a and a' do not coincide. This causes a false null in the output of the rectifiers 35. The rectifiers 39 operate in the same manner as the rectifiers 35, but the false null occurs at an angle 120° away from that of the rectifiers 35. The third pair of rectifiers 47 similarly produce a false null at an angle 120° from that of the other rectifiers. Since these false nulls occur at different angles, the total output of the rectifier will be zero only when all of the voltages aa', bb' and cc' are zero.

The output circuits of the rectifiers 35, 39 and 47 are connected in series to the input circuit of the D.-C. amplifier 23. A capacitor 55 is provided for smoothing out the pulsations in the combined output of the rectifiers. The amplifier 23 is of conventional design, comprising a pair of triode tubes 57 connected in push-pull and conductively coupled to the input and output circuits. The output circuit of the amplifier 57 is connected to the control grids of a pair of power amplifier tubes 59 and 61. The anode-to-cathode circuit of the tube 59 is connected to the primary of a transformer 63 which is provided with two secondary windings 65 and 67. The tube 61 is similarly connected to a transformer 69 with secondary windings 71 and 73. The secondaries 65, 67, 71 and 73 are connected in a bridge circuit, with one winding 75 of the motor 15 connected to one pair of conjugate terminals. The other winding 77 of the motor 15 is shunted by a phase split capacitor 79 and connected in series with the other pair of conjugate terminals of the bridge circuit across the A.-C. line.

The operation of the power control circuit is as follows:

The output of the amplifier 23 drives the control grids of the tubes 59 and 61 in opposite directions, for example the grid of the tube 59 is made positive while the grid of the tube 61 is driven negative. The tube 59 reflects a low impedance across the transformer secondaries 65 and 67 while the tube 61 reflects a high impedance across the secondaries 71 and 73. This causes current to flow through the motor winding 75 through the path including the secondaries 65 and 67, so that when the current is flowing through the winding 77 in the direction indicated by the solid arrow, current flows through the winding 75 in the direction indicated by the solid arrow. When the tube 61 is more conductive than the tube 59, current flows through the windings 71 and 73, causing reversal through the winding 75 with respect to that through the winding 77, as indicated by the dotted arrows. Thus the motor 15 is caused to run in one direction or the other depending upon the polarity of the D.-C. output of the direction rectifier 21.

We claim as our invention:

1. A differential servo system including input shafts and an output shaft, means for deriving a first group of A.-C. voltages related to each other in magnitude in accordance with the angular position of one of said input shafts, means for varying the relations between said voltages in accordance with the angular position of said output shaft to produce a second group of voltages related to each other in accordance with the difference in the angular positions of said one input shaft and said output shaft, means for deriving a third group of voltages related to each other in accordance with the angular position of another of said input shafts, a motor coupled to said output shaft and means responsive to the sum of the differences between each of said second voltages and a corresponding one of said third voltages to control the energization of said motor.

2. A differential servo system including two input shafts and an output shaft, means for deriving a first group of A.-C. voltages related in magnitude to each other in accordance with a predetermined function of the angular position of one of said input shafts, means for deriving a second group of A.-C. voltages similarly related to each other in accordance with the angular difference in position between the other of said input shafts and said output shaft, a plurality of rectifiers, each connected to respond to the difference between one voltage of said first group and a corresponding voltage of said second group, means for combining the outputs of said rectifiers, an electric motor coupled to said output shaft, and means responsive to said combined rectifier output to control the energization of said motor.

3. The invention as set forth in claim 2 wherein each of said rectifiers comprises a pair of electron discharge tubes connected symmetrically and means for applying thereto the sum of one voltage from said first group and one voltage from said second group as anode supply potential.

4. A system for comparing two groups of A.-C. voltages, the voltages of each group being interrelated so as to define an angle, comprising a plurality of rectifier means each comprising a pair of electron discharge tubes each provided with at least an anode, a cathode, and a control grid, and connected symmetrically, means for applying the differences between corresponding voltages of said groups to the control grid circuits of said rectifiers, means for applying the sum of one voltage from said first group and one voltage from said second group to the anode circuit of each of said rectifiers, and means for adding resulting D.-C. outputs of all of said rectifiers.

5. A servo system including means for deriving two groups of A.-C. voltages, the voltages of each group being interrelated so as to define an angular position, a plurality of grid-controlled rectifiers with control input circuits connected to respond to the differences between the corresponding voltages of each of said groups, anode circuits connected to receive the sums of pairs of voltages, one from each of said groups, and output circuit connected in series whereby a D.-C. voltage equal to the sum of the outputs of said rectifiers is produced, amplifier means connected to respond to said D.-C. voltage, a power control circuit connected to said amplifier means, and a motor connected to said power control circuit.

6. A control rectifier for electrical servo systems including two electron discharge tubes each comprising at least an anode, a cathode, and a control grid, means for applying the difference between two first A.-C. voltages to said control grids in opposite polarities, and means for applying the sum of two second A.-C. voltages related in magnitude in a predetermined manner to said first A.-C. voltages to said anodes in the same polarity.

ROBERT N. LESNICK.
LESLIE E. MATSON, Jr.

REFERENCES CITED

The following references are of record in the file of this patent:

UNITED STATES PATENTS

| Number | Name | Date |
|---|---|---|
| 2,296,436 | Goddard | Sept. 22, 1942 |
| 2,164,728 | Wey | July 4, 1939 |
| 2,287,002 | Moseley | June 16, 1942 |
| 1,999,645 | Wittkuhns | Apr. 30, 1935 |
| 2,253,307 | Richter | Aug. 19, 1941 |
| 1,732,987 | Rowell | Oct. 22, 1929 |